United States Patent Office 3,211,635
Patented Oct. 12, 1965

3,211,635
PRODUCTION OF OLEFINS FROM PARAFFINS AND ACETYLENES
Norbert F. Cywinski, Bartlesville, Okla., assignor to Phillips Petroleum Company, a corporation of Delaware
No Drawing. Filed Apr. 14, 1961, Ser. No. 102,920
6 Claims. (Cl. 204—162)

This invention relates to the formation of olefins from lower molecular weight reactant materials. In accordance with one aspect, this invention relates to a novel process involving a condensation reaction for the production of olefins from paraffins and acetylenes.

Various processes are known for the production of olefins from lower molecular weight materials. Some of these known processes employ catalysts while others are purely thermal. However, many of the known processes have various disadvantages for one reason or another. For example, some of these processes require high temperatures, others require expensive catalysts, while still others require expensive and difficult-to-produce reactants. Thus, it can be safely said that there is still considerable room for improvement in the production of these materials, especially with respect to the provision of a process wherein readily available reactants can be used for the production of valuable olefin products.

The present invention relates to a novel process for the production of olefins by the condensation of paraffins and acetylenic compounds in the presence of an initiator.

Accordingly, an object of this invention is to provide a novel process for the production of olefins.

Another object of this invention is to provide a process for the condensation of paraffins and acetylenes.

It is a further object of this invention to provide a free radical initiated process for producing olefins by condensation of acetylenes and paraffins.

Other objects, aspects as well as the several advantages of this invention will be apparent to those skilled in the art upon a further study of the specification and the appended claims.

According to the invention, I provide a novel process for the production of olefins which comprises contacting a paraffin hydrocarbon having at least 2 carbon atoms per molecule with an acetylenic material selected from the group consisting of acetylene and alpha-alkynes having from 3 to 5, inclusive, carbon atoms per molecule under reaction conditions of temperature and pressure in the presence of a free radical initiator, and recovering the olefin product thus produced.

The paraffin reactants that can be employed according to the invention have at least 2 carbon atoms per molecule and can be open or branched chain paraffins (alkanes) or cycloparaffins (cycloalkanes) and alkyl substituted cycloparaffins. Reactivity of the paraffins is greatest at the tertiary carbon, less at the secondary carbon, and least at the end carbon in the molecule. Thus, since hydrogen on a secondary or tertiary carbon is more reactive than hydrogen on an end carbon, more rapid reaction is achieved using paraffins of at least 3 carbon atoms. Although there is no critical upper limit as to the molecular weight of the paraffin reactant, generally paraffins containing from 3 to about 15 to 20 carbon atoms per molecule are used.

Representative examples of suitable open chain paraffins or alkanes that can be employed include ethane, propane, butane, pentane, hexane, octane, decane, isobutane, 2,2-dimethylbutane, 2-methylpentane, 3-ethylpentane, 2,2,3-trimethylbutane, 3-ethylhexane, 2,3-dimethyloctane, 2,2-dimethyldodecane, 2-methylpentadecane, and the like. Suitable cycloparaffins (cycloalkanes) or alkyl substituted cycloparaffins that can be employed include cyclopentane, cyclohexane, cycloheptane, cyclooctane, methylcyclopentane, methylcyclohexane, 1,2-dimethylcyclopentane, 1,3-dimethylcyclohexane, 1-methyl-3-isopropylcyclohexane, and the like.

Since reactivity of the paraffins is greatest at the tertiary carbon, less at the secondary carbon, and least at the end carbon in the molecule, a highly selective reaction is obtained using paraffins such as isobutane, 2,3-dimethylbutane, methylcyclopentane, and propane wherein only one of the more reactive sites is available with other carbons being less reactive carbon sites. Also, selective reaction is obtained from cyclopentane and cyclohexane, for example, since all carbon atoms in each molecule are equivalent.

The acetylenic compounds that can be employed according to the invention can be acetylene itself or alpha-acetylenes (alkynes) containing from 3 to 5 carbon atoms per molecule. Representative examples of suitable alpha-acetylenes include methylacetylene, ethylacetylene, n-propylacetylene, and the like. Since the substituted acetylenes can react at 2 points on the chain, complete selectivity as to olefin type is not achieved; however, olefins are produced in either case.

As indicated above, the condensation reaction of the paraffins and acetylenes according to the invention is carried out in the presence of a free radical initiator. Suitable initiators for furnishing free radicals are organic peroxy and azo compounds which have half lives in the range of 0.05 to 20 hours at reaction conditions. Representative examples of suitable free radical initiators include di-tert-butyl peroxide, tert-butyl hydroperoxide, benzoyl peroxide, azobisisobutyronitrile, tert-butylbenzene hydroperoxide, dicumyl peroxide, and the like.

Also, according to the invention, actinic or chemically active rays such as ultraviolet can be employed in conjunction with the free radical initiators to increase the reaction rate and reduce the temperature and/or time requirement for equivalent conversion. Ultraviolet, for example, assists in starting free radical formation.

Although the reaction mechanism of the invention has not been fully established, the results obtained are consistent with a free radical chain mechanism. This is illustrated below using acetylene and a general symbol RH for the paraffin:

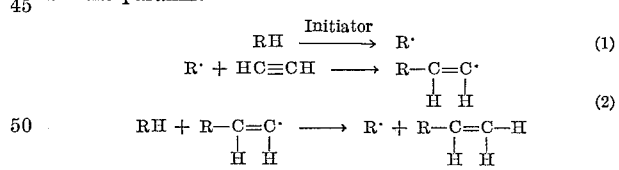

The free radical produced in Reaction 3 then repeats Reaction 2 with another molecule of acetylene. The chain is eventually broken by two of free radicals, R·, uniting or by a chain-terminating impurity. Thus, a finite amount of initiator is required.

The reaction conditions of temperature, pressure, time, etc., can vary appreciably depending upon the particular reactants and initiators employed. However, in general the reaction temperature ranges from about 30° to about 500° F. and the reaction pressure is sufficient to maintain a liquid phase. Reaction time varies inversely with temperature and ordinarily ranges from about 0.1 to 100 hours or more. As indicated above, the use of ultraviolet light in conjunction with the free radical initiator increases the reaction rate and reduces temperature and/or time requirement for equivalent conversion.

The ratio or amounts of the reactants and initiator employed will vary appreciably. However, best results are obtained by employing from about 1 to about 30 mole percent of the acetylene in the liquid paraffin hydrocarbon charge, although more or less can be satisfactorily employed. The amount of initiator present ordinarily ranges from about 2 to 25 mole percent of the acetylene charge.

Numerous variations in operative procedure can be employed. The process of this invention can be carried out as a batch process, for example, by charging the reactants into a reactor (autoclave) containing an initiator. Although any suitable charging procedure can be used, the paraffin is generally charged first followed by the initiator and acetylenic compound. Also, if desired, the present process can be carried out in a continuous manner.

It is desirable to keep the reaction system as free of chain terminating components as practicable since the condensation reaction appears to be a chain reaction once it is initiated. Such undesirable materials include mercaptans, quinones, and the like. It is highly desirable, therefore, that the feed components or reactants be freed of these materials as well as other materials which may tend to inhibit the reaction. Any of the known means for removing such contaminants can be used. High feed purity with respect to these undesirable chain terminating components produces higher yields of product based on the initiator.

At the completion of the condensation reaction, the total reaction mixture can be subjected to any suitable known separation procedure, e.g., distillation, extraction, etc., for recovering the olefinic product and unreacted reactants that may be present.

The olefin hydrocarbon products produced in accordance with the present invention have wide utility in the chemical industry. For example, olefins have wide utility as reactants in the various polymerization processes recently developed.

A better understanding of my invention will be obtained upon reference to the following illustrative examples which are not intended, however, to be unduly limitative of the invention.

*Example I*

A run was carried out in which isobutane was contacted with acetylene in the presence of benzoyl peroxide to form a mixture of $C_6$ olefins.

In this run, 250 grams (4.3 moles) of isobutane was heated in a 1 liter autoclave at a temperature ranging from 165 to 175° F. for 29 hours under a partial pressure of 100 p.s.i. g. of acetylene (approximately 5 mole percent) using 2.93 grams (0.012 mole) of benzoyl peroxide as an initiator. The product obtained amounted to 6.8 grams (0.081 mole) of $C_6$ terminal olefins. Thus, 6.7 moles of $C_6$ olefin was obtained per mole of peroxide used as initiator.

The $C_6$ olefin product produced was 10/1 3,3-dimethyl-1-butene/4-methyl-1-pentene, thus showing high selectivity for addition at the tertiary carbon. Statistically, assuming all hydrogens of equal activity, the above ratio would be 1/9. Thus, a hydrogen attached to a tertiary carbon is about 90 times as reactive as a hydrogen attached to a primary carbon.

*Example II*

In another run cyclohexane was reacted with acetylene in the presence of benzoyl peroxide to form vinylcyclohexane.

In this run, 228 grams (2.71 moles) of cyclohexane was heated in a 1 liter autoclave at a temperature ranging from 165 to 175° F. for 23 hours under a partial pressure of 100 p.s.i.g. acetylene (approximately 5 mole percent) using 3.54 grams (0.0146 mole) of benzoyl peroxide as the initiator. The product obtained amounted to 0.0394 moles of vinylcyclohexane.

As will be evident to those skilled in the art, many variations and modifications of this invention can be practiced in view of the foregoing disclosure. Such variations and modifications are clearly believed to come within the spirit and scope of the invention.

I claim:

1. A process for the production of olefins which comprises contacting a paraffin hydrocarbon having at least 2 carbon atoms per molecule with an acetylenic material selected from a group consisting of acetylene and alpha-alkynes having from 3 to 5, inclusive, carbon atoms per molecule in the presence of ultraviolet light and a free radical initiator selected from the group consisting of organic peroxy and azo compounds having half-lives in the range of 0.05 to 20 hours at reaction conditions of temperature and pressure, and recovering the olefin product thus produced.

2. A process for the production of olefins which comprises contacting a paraffin hydrocarbon having at least 2 carbon atoms per molecule with an acetylenic material selected from the group consisting of acetylene and alpha-alkynes having from 3 to 5, inclusive, carbon atoms per molecule in the presence of a free radical initiator selected from the group consisting of organic peroxy and azo compounds having half-lives in the range of 0.05 to 20 hours at a temperature in the range of 30° to about 500° F., and a pressure sufficient to maintain a liquid phase, and recovering said olefins as product.

3. A process for the production of olefins which comprises contacting an isoparaffin with acetylene at a temperature in the range 30° to 500° F. and a pressure sufficient to maintain a liquid isoparaffin phase in the presence of benzoyl peroxide, and recovering the olefins thus produced.

4. A process according to claim 3 wherein said isoparaffin is isobutane and said product comprises a mixture of $C_6$ olefins.

5. A process for the production of olefins which comprises contacting a cycloparaffin with acetylene at a temperature in the range 30 to 500° F. and a pressure sufficient to maintain a liquid phase in the presence of benzoyl peroxide, and recovering the olefins thus produced.

6. A process according to claim 5 wherein said cycloparaffin is cyclohexane and said product contains vinylcyclohexane.

References Cited by the Examiner
UNITED STATES PATENTS

| | | | |
|---|---|---|---|
| 2,266,848 | 12/41 | Chappell | 260—683.9 |
| 2,396,217 | 3/46 | Vaughan et al. | 260—677 |
| 2,626,286 | 1/53 | Voorhies et al. | 260—683.9 |
| 2,640,023 | 5/53 | Cier | 204—162 |
| 2,655,474 | 10/53 | Schutze et al. | 204—162 |
| 3,008,886 | 11/61 | Sarantites | 204—162.1 |
| 3,125,498 | 3/64 | Bartok et al. | 204—162.1 |

FOREIGN PATENTS 309,002   4/29   Great Britain.

OTHER REFERENCES

Free Radicals by A. F. Trotman-Dickenson, pp. 6–9, Methuen and Company Limited, London, 1959.

Advanced Organic Chemistry (second edition), by G. W. Wheland, chapter 15, pp. 661–5 and 704, John Wiley and Sons, Inc., New York, 1949.

ALPHONSO D. SULLIVAN, *Primary Examiner.*